US012328391B2

(12) United States Patent
Koren et al.

(10) Patent No.: US 12,328,391 B2
(45) Date of Patent: Jun. 10, 2025

(54) MANAGING SECRET VALUES USING A SECRETS MANAGER

(71) Applicant: SAP SE, Walldorf (DE)

(72) Inventors: Nir Koren, Kfar Saba (IL); Slava Rubejevsky, Ashdod (IL)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 17/454,917

(22) Filed: Nov. 15, 2021

(65) Prior Publication Data

US 2023/0155817 A1    May 18, 2023

(51) Int. Cl.
*H04L 9/08* (2006.01)
*G06F 18/214* (2023.01)
*G06N 20/00* (2019.01)

(52) U.S. Cl.
CPC ............ *H04L 9/085* (2013.01); *G06F 18/214* (2023.01); *G06N 20/00* (2019.01); *H04L 9/0825* (2013.01)

(58) Field of Classification Search
None
See application file for complete search history.

(56) References Cited

U.S. PATENT DOCUMENTS

| | | | |
|---|---|---|---|
| 8,584,079 B2 | 11/2013 | Yassin et al. | |
| 8,843,453 B2 | 9/2014 | Koren et al. | |
| 8,938,504 B2 | 1/2015 | Sklarski | |
| 8,984,489 B2 | 3/2015 | Yassin et al. | |
| 10,078,754 B1* | 9/2018 | Brandwine | G06F 21/78 |
| 10,146,673 B2 | 12/2018 | Koren et al. | |
| 11,223,489 B1* | 1/2022 | Miller | H04L 9/0897 |
| 12,212,606 B1* | 1/2025 | Roth | G06F 21/64 |
| 2016/0241390 A1* | 8/2016 | Harris | G06F 21/602 |
| 2017/0353436 A1* | 12/2017 | Jurss | H04L 63/1441 |
| 2018/0151007 A1* | 5/2018 | Einberg | G07C 9/28 |
| 2020/0052889 A1* | 2/2020 | Bendersky | H04L 9/0861 |
| 2020/0053079 A1* | 2/2020 | Bendersky | H04L 9/14 |
| 2020/0053096 A1* | 2/2020 | Bendersky | G06F 21/32 |

(Continued)

OTHER PUBLICATIONS

Pytorch.org [online], "Pytorch : From Research to Production" Jan. 2017, [retrieved on Nov. 15, 2021], retrieved from : URL <https://pytorch.org/ >, 3 pages.

(Continued)

*Primary Examiner* — Saleh Najjar
*Assistant Examiner* — Shadi H Kobrosli
(74) *Attorney, Agent, or Firm* — Fish & Richardson P.C.

(57) ABSTRACT

The present disclosure involves systems, software, and computer implemented methods for managing secret values. One example method includes receiving a request for a secret value that is stored at a secrets provider. The request is provided to a machine learning model that is included in a secrets manager that is separate from the secrets provider. The machine learning model determines whether the request for the secret value is valid. In response to determining that the request for the secret value is not valid, the request for the secret value is denied without providing the request for the secret value to the secrets provider. In response to determining that the request for the secret value is valid, the request for the secrets value is provided to the secrets provider. A secret value received from the secrets provider is provided to the machine learning model to determine whether secret value is valid.

19 Claims, 4 Drawing Sheets

(56) References Cited

U.S. PATENT DOCUMENTS

| | | | | |
|---|---|---|---|---|
| 2020/0244455 | A1* | 7/2020 | Teitzel | G06N 20/00 |
| 2021/0328969 | A1* | 10/2021 | Gaddam | G06F 21/44 |
| 2021/0385069 | A1* | 12/2021 | Reid | H04L 9/3239 |
| 2022/0004651 | A1* | 1/2022 | Brodie | G06F 16/122 |
| 2022/0006637 | A1* | 1/2022 | Nevis | G06F 16/188 |
| 2022/0114249 | A1* | 4/2022 | Grancharov | G06F 21/12 |
| 2022/0237282 | A1* | 7/2022 | Tzur-David | H04L 63/126 |
| 2022/0261487 | A1* | 8/2022 | Lounsberry | G06F 21/62 |
| 2023/0008976 | A1* | 1/2023 | Xu | H04L 9/3247 |
| 2023/0041959 | A1* | 2/2023 | Guccione | H04L 9/0866 |
| 2024/0129306 | A1* | 4/2024 | Jalal | H04L 63/10 |
| 2024/0146734 | A1* | 5/2024 | Southgate | G06F 21/6227 |

OTHER PUBLICATIONS

Vaultproject.io [online], "Introduction to Vault" Feb. 2020, [retrieved on Nov. 15, 2021], retrieved from : URL <https://www.vaultproject.io/docs/what-is-vault>, 3 pages.

Wikipedia.org [online], "Computer Access Control" created on Dec. 2013, [retrieved on Nov. 15, 2021], retrieved from : URL <https://en.wikipedia.org/wiki/Computer_access_control>, 6 pages.

* cited by examiner

MANAGING SECRET VALUES USING A SECRETS MANAGER

TECHNICAL FIELD

The present disclosure relates to computer-implemented methods, software, and systems for managing secret values.

BACKGROUND

A cloud platform can include or use a vault service. The vault service can store secret information used by applications. For example, the vault can store tokens, passwords, certificates, encryption keys, or other secret information. An application can authenticate to the vault service to store or retrieve secret information.

SUMMARY

The present disclosure involves systems, software, and computer implemented methods for managing secret values. An example method includes: receiving a request for a secret value that is stored at a secrets provider; providing the request for the secret value as a first input to a machine learning model that is trained to determine whether secret values and requests for secret values are valid, wherein the machine learning model is included in a secrets manager that is separate from the secrets provider; receiving a first output from the machine learning model that indicates whether the request for the secret value is valid; in response to determining that the request for the secret value is not valid, denying the request for the secret value without providing the request for the secret value to the secrets provider; and in response to determining that the request for the secret value is valid: providing the request for the secrets value to the secrets provider; receiving the secret value from the secrets provider; providing the secret value as a second input to the machine learning model; receiving a second output from the machine learning model that indicates whether the secret value is valid; in response to determining that the secret value is not valid, denying the request for the secret value; and in response to determining that the secret value is valid, providing the secret value in response to the request.

Implementations can include one or more of the following features. The secrets provider can be a software vault system. Providing the request to the secrets provider can include logging in to the secrets provider. The request for the secret value can include a key that is mapped to the secret value at the secrets provider. In response to determining that the request is not valid, a notification can be provided to an administrator device. In response to determining that the secret value is not valid, notification a can be provided to the administrator device. Denying the request for the secret value can include providing a response to the request that indicates that the request has been denied. Determining that the request for the secret value is not valid can include, determining, by the machine learning model, that a device identifier associated with the request is not authorized to make the request. Determining that the request for the secret value is not valid can include determining that a number of requests associated with the device identifier in a predetermined time period has exceeded a predetermined threshold. Determining that the request for the secret value is not valid can include determining that a number of requests for the secret value in a predetermined time period has exceeded a predetermined threshold. Determining that the secret value is not valid can include determining that the secret value does not comply with at least one policy.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Software applications can send requests for secret values (e.g., passwords, encryption keys, etc.) to a secrets provider, such as a vault system. However, rather than interact directly with a secrets provider, applications can instead interact with a secrets manager that interacts with the secrets provider on behalf of the applications. The secrets manager can be situated between applications and secret providers, to mediate and manage secret requests and secret values obtained from the secrets providers.

The secrets manager can provide various value-added benefits as compared to applications directly accessing secret providers. For example, the secrets manager can provide additional security by using machine learning to analyze and validate requests from applications and secret values provided by secret providers. For example, the secrets manager can identify invalid, suspicious, or fraudulent requests. As another example, the secrets manager can identify problems with requested secret values, such as values that violate one or more existing policies. Other examples include the secrets manager using machine learning to provide other types of insights regarding requests for or values of requested secrets.

The machine learning system of the secrets manager can be trained using configured rules or policies, and may also be based on administrator feedback from analysis results of secret requests or secret values. The machine learning system can be trained to identify potential risks and security concerns including security attacks or risky patterns of use of secret values. The secrets manager can block secret requests if a problem is identified with the request or with the secret value. Administrators can be notified as appropriate. Other advantages and specific examples are described in more detail below.

Figure 1:
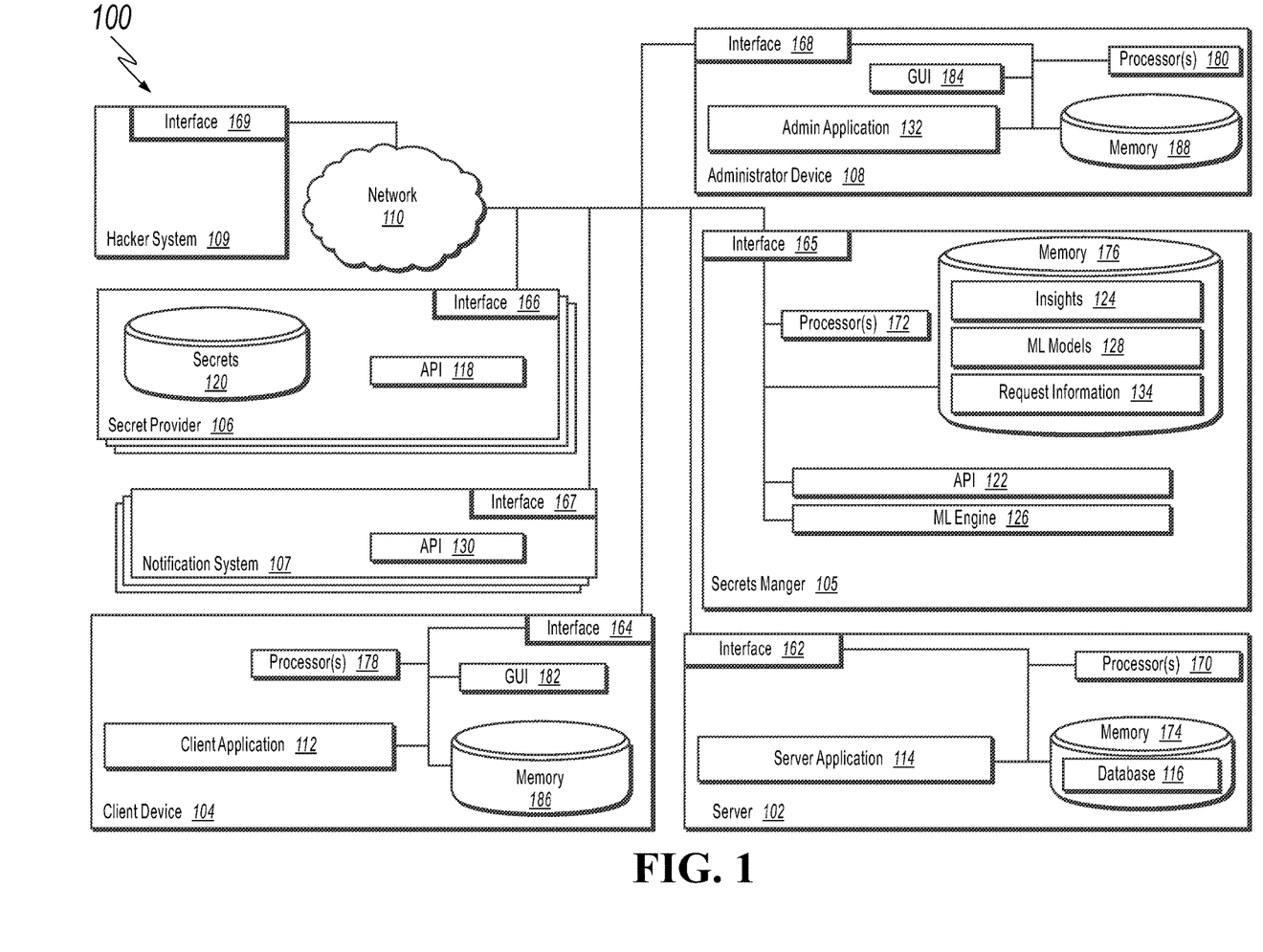
FIG. 1 is a block diagram illustrating an example system for managing secret values.

FIG. 1 is a block diagram illustrating an example system 100 for managing secret values. Specifically, the illustrated system 100 includes or is communicably coupled with a server 102, a client device 104, a secrets manager 105, secrets providers including a secret provider 106, notification systems including a notification system 107, an administrator device 108, a hacker system 109, and a network 110.

Although shown separately, in some implementations, functionality of two or more systems or servers may be provided by a single system or server. For example, in some implementations, the server 102 and the secrets manager 105 may be the same system or server. As another example, in some implementations, the functionality of one illustrated system, server, or component may be provided by multiple systems, servers, or components, respectively.

An end user can use a client application 112 on the client device 104. The client application 112 may be a client-side version of a server application 114 running on the server 102. The client application 112 and/or the server application 114 may determine to request access to a particular resource. For example, a respective application may determine to request access to a database 116 on the server 102 (or on another server or system). Other types of resource accesses can be requested. Access to some resources can require authentication information, such as a login identifier and password.

Although the client application 112 or the server application 114 can include hard-coded authentication to resources, the client application 112 or the server application 114 can alternatively use the secrets provider 106 (or other secrets provider(s)) to obtain authentication information for accessing a resource. For example, the secrets provider 106 can store password information for resources indexed by login identifier. The secrets provider 106 can be a software vault system, for example.

The client application 112 or the server application 114 can authenticate, using an Application Programming Interface (API) 118 of the secrets provider 106, to the secrets provider 106 and submit a key (e.g., login identifier) to request a corresponding secret value (e.g., password) from the secrets provider 106. The secrets provider 106 can retrieve the secret value from a secrets repository 120 and provide the requested secret value to the client application 112 or the server application 114. Although login passwords are described as example secret values, other types of secret values can be used. For example, the client application 112 or the secrets application 114 can request access to tokens, other types of passwords, certificates, encryption keys, API keys, or other types of secret values.

Although using the secrets provider 106 can result in decreased software maintenance as compared to hard-coding authentication into the client application 112 or the server application 114, use of the secrets provider 106 can also result in software maintenance issues. For example, by using the API 118, the client application 112 or the server application 114 can become coupled to the secrets provider 106 (e.g., the client application 112 or the server application 114 can become coupled to a particular type of vault system by including API calls for the API 118 in the respective application). If a developer of the client application 112 or the server application 114 desires to switch to a different secrets provider, the respective application may need changes to switch out API calls for the API 118 with API calls for the different secrets provider.

Instead of directly accessing the secrets provider 106, the client application 112 or the server application 114 can instead interface with the secrets manager 105. The secrets manager 105 can receive, at an API 112, application requests for secret values, forward the requests for secrets values to a given secrets provider such as the secrets provider 106, receive secret values from the secrets provider, and forward secret values to respective applications. The secrets manager 105 can be configured to interface with different types of secrets providers. A new type of secrets provider can be installed in the system 100 without requiring a change to code of the client application 112 or the server application 114, since the respective application can continue to send requests to the secrets manager 105 using the API 122. The secrets manager 105 can serve as an abstraction layer to shield applications from details regarding access particular secrets providers.

In addition to reduction in software maintenance costs, the secrets manager 105 can provide numerous other value-added benefits for secrets management. As described in more detail below, the secrets manager 105 can provide additional security benefits. For example, some secrets providers such as the secrets provider 106 may be vulnerable to security attacks. For example, the hacker system 109 may intercept communication to or from the secrets provider 106. The secrets provider 106 may not be configured to analyze and detect fraudulent requests, for example. However, the secrets manager 105 can be configured to analyze all communication to and from the secrets provider 106, to detect fraudulent activity and provide other insights or analysis.

For example, a machine learning (ML) engine 126 of the secrets manager 105 can use one or more trained ML models 128 to perform analysis of secret requests and secret values. The ML engine 126 can be trained based on frequency of request for particular secrets, frequency of requests from particular requestors, frequency of request for particular secrets by particular requestors, time of day when requests are made, locations and devices from which requests are received, and other request characteristics. Analysis of secret values can be performed using ML learned rules and/or based on prescribed rules that specify policies for secret values. For example, the ML engine 126 can be configured with policy rules that specify rules for passwords or rules for other types of secret values. The ML engine 126 can learn which requests and secret values are valid, which are invalid, and which may be suspicious.

The secrets manager 105 can perform one or more actions in response to determining that a request or a secret value is invalid or suspicious. For example, if the secrets manager 105 determines that a secrets request is invalid (e.g., based on a likelihood of fraud being more than a predetermined threshold), the secrets manager 105 can block the secrets request (e.g., not forward the secrets request to the secrets provider 106). As another example, if the secrets manager 105 determines an issue with a secret value received from the secrets provider 106, the secrets manager 105 can block sending of the secret value to the requestor. The secrets manager 105 can respond to the requestor (e.g., the client application 112 or the server application 114) with an error message, indicating that an issue was determined with the request or the secret value itself.

If the secrets request is accepted by the secrets manager 105 and the secrets manager does not discover any issues with the requested secret value, the secrets manager 105 can provide the requested secret value to the requesting application. In some cases, the secrets manager 105 can provide a requested secret value to a requestor along with an informational message indicating insights or analysis results from analyzing the secret value. For example, a warning or a suggestion can be provided to the requestor, along with the secret value.

The secrets manager 105 can invoke an API 130 of the notification system 107 to cause generation of a notification (e.g., e-mail, text message, application message) for an administrator that communicates request/secret value analysis results such as error conditions, security issues, or other insights or information. The administrator can receive the notification on the administrator device 108, such as in an e-mail application, a messages application, or in an administrative application 132. In some implementations, the administrative application 132 can enable the administrator to respond to the notification, such as to provide feedback regarding whether the request or secret value that was identified as invalid or fraudulent is actually invalid or fraudulent. The administrative application 132 can invoke the API 122 of the secrets manager 105 to provide the feedback to the ML engine 126. The ML engine 126 can adjust the ML models 128 based on the received feedback.

The secrets manager 105 can store analysis results (e.g., as the insights 124) and request information 134 for use in analyzing future requests. For example, the secrets manager 105 can store requestor information such as requestor identifier, user identifier, machine identifier, Internet Protocol (IP) address, location information for the request, and other request information. Additionally, the secrets manager 105 can store results of analyzing the current request, such as whether the request matched any rules or patterns, whether the request was determined to be valid or invalid, whether the request was accepted or rejected, etc.

In some implementations, the system 100 includes one secrets manager 105, as shown. In some cases, the secrets manager 105 is a cloud component and can provide secrets management services for different customers, applications, and systems. In such implementations, the machine learning engine 126 can be trained and learned based on inputs, processing, and results from the different customers, applications, and systems. That is, the machine learning engine 126 can learn from secret provider requests and secret values requested or used by different types of applications in different landscapes. As such, the machine learning system can learn patterns of use across applications or systems. In other implementations, multiple secrets managers 105 can be used. For example, different on-premise systems can each have a respective secrets manager 105. As mentioned, a given secrets manager 105 can manage requests for one secrets provider or many secrets providers of a same or different types. Additional details regarding operation and processing of the secrets manager 105 are described below.

As used in the present disclosure, the term "computer" is intended to encompass any suitable processing device. For example, although FIG. 1 illustrates a single server 102, a single client device 104, a single administrator device 108, and a single secrets manager 105, the system 100 can be implemented using multiple of such devices. The server 102, the client device 104, the secrets manager 105, and other computing devices may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated computing devices may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 162, 164, 165, 166, 167, 168, and 169 are used by the client the server 102, the client device 104, the secrets manager 105, the secrets provider 106, the notification system 107, the administrator device 108, and the hacker system 108, respectively, for communicating with other systems in a distributed environment—including within the system 100—connected to the network 110. Generally, the interfaces 162, 164, 165, 166, 167, 168, and 169 each comprise logic encoded in software and/or hardware in a suitable combination and operable to communicate with the network 110. More specifically, the interfaces 162, 164, 165, 166, 167, 168, and 169 may each comprise software supporting one or more communication protocols associated with communications such that the network 110 or interface's hardware is operable to communicate physical signals within and outside of the illustrated system 100.

The server 102 and the secrets manager 105 each respectively include one or more processors 170 or 172. Each processor in the processors 170 and 172 may be a central processing unit (CPU), a blade, an application specific integrated circuit (ASIC), a field-programmable gate array (FPGA), or another suitable component. Generally, each processor in the processors 170 and 172 executes instructions and manipulates data to perform the operations of the server 102 or the secrets manager 105, respectively. Specifically, each processor in the processors 172 can execute the functionality required to receive and respond to requests from the client application 112 or the server application 14, for example. Each processor in the processors 170 can execute the functionality required to receive and respond to requests from the client device 104.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 and the secrets manager 105 each respectively include memory 174 or 176. In some implementations, the server 102 and/or the secrets manager 105 include multiple memories. The memories 174 and 176 may each include any type of memory or database module and may take the form of volatile and/or non-volatile memory including, without limitation, magnetic media, optical media, random access memory (RAM), read-only memory (ROM), removable media, or any other suitable local or remote memory component. The memories 174 and 176 may each store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102 or the secrets manager 105, respectively.

The client device 104 and the administrator device may each generally be any computing device operable to connect to or communicate with the server 102, the secrets manager 105, or the notification systems 107 via the network 110 using a wireline or wireless connection. In general, the client device 104 and the administrator device 108 each comprise an electronic computer device operable to receive, transmit, process, and store any appropriate data associated with the system 100 of FIG. 1. The client device 104 and the administrator device 108 can each include one or more client applications, including the client application 112 or the administrative application 132. A client application is any type of application that allows the client device 104 or the administrator device 108 to request and view content on the respective device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator device 108 each further include one or more processors 178 or 180. Each processor 178 or 180 may be a central processing unit (CPU), an application specific integrated circuit (ASIC), a field-programmable gate array (FPGA), or another suitable component. Generally, each processor 178 or 180 executes instructions and manipulates data to perform the operations of the client device 104 or the administrator device 108, respectively. Specifically, each processor 178 or 180 executes the functionality required to send requests to the server 102 or the secrets manager 105 and to receive and process responses from the server 102 or the secrets manager 105.

The client device 104 and the administrator device 108 are each generally intended to encompass any client computing device such as a laptop/notebook computer, wireless data port, smart phone, personal data assistant (PDA), tablet computing device, one or more processors within these devices, or any other suitable processing device. For example, the client device 104 and/or the administrator device 108 may comprise a computer that includes an input device, such as a keypad, touch screen, or other device that can accept user information, and an output device that conveys information associated with the operation of the system 100 or the respective device itself, including digital data, visual information, or a Graphical User Interface (GUI) 182 or 184, respectively. The term "client", "client device" and "user" may be used interchangeably as appropriate without departing from the scope of this disclosure. Moreover, while the client device 104 and the administrator device 180 may be described in terms of being used by a single user, this disclosure contemplates that many users may use one computer, or that one user may use multiple computers.

The GUI 182 and the GUI 184 each can interface with at least a portion of the system 100 for any suitable purpose, including generating a visual representation of the client application 112 or the administrative application 132, respectively. In particular, the GUI 182 and the GUI 184 may each be used to view and navigate various Web pages, or other user interfaces. Generally, the GUI 182 and the GUI 184 each provide the user with an efficient and user-friendly presentation of business data provided by or communicated within the system. The GUI 182 and the GUI 184 may each comprise a plurality of customizable frames or views having interactive fields, pull-down lists, and buttons operated by the user. The GUI 182 and the GUI 184 each contemplate any suitable graphical user interface, such as a combination of a generic web browser, intelligent engine, and command line interface (CLI) that processes information and efficiently presents the results to the user visually.

Memory 186 or 188 included in the client device 104 or the administrator device 108 may each include any memory or database module and may take the form of volatile or non-volatile memory including, without limitation, magnetic media, optical media, random access memory (RAM), read-only memory (ROM), removable media, or any other suitable local or remote memory component. The memory 186 or 188 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104 or the administrator device 108, respectively.

Figure 2:
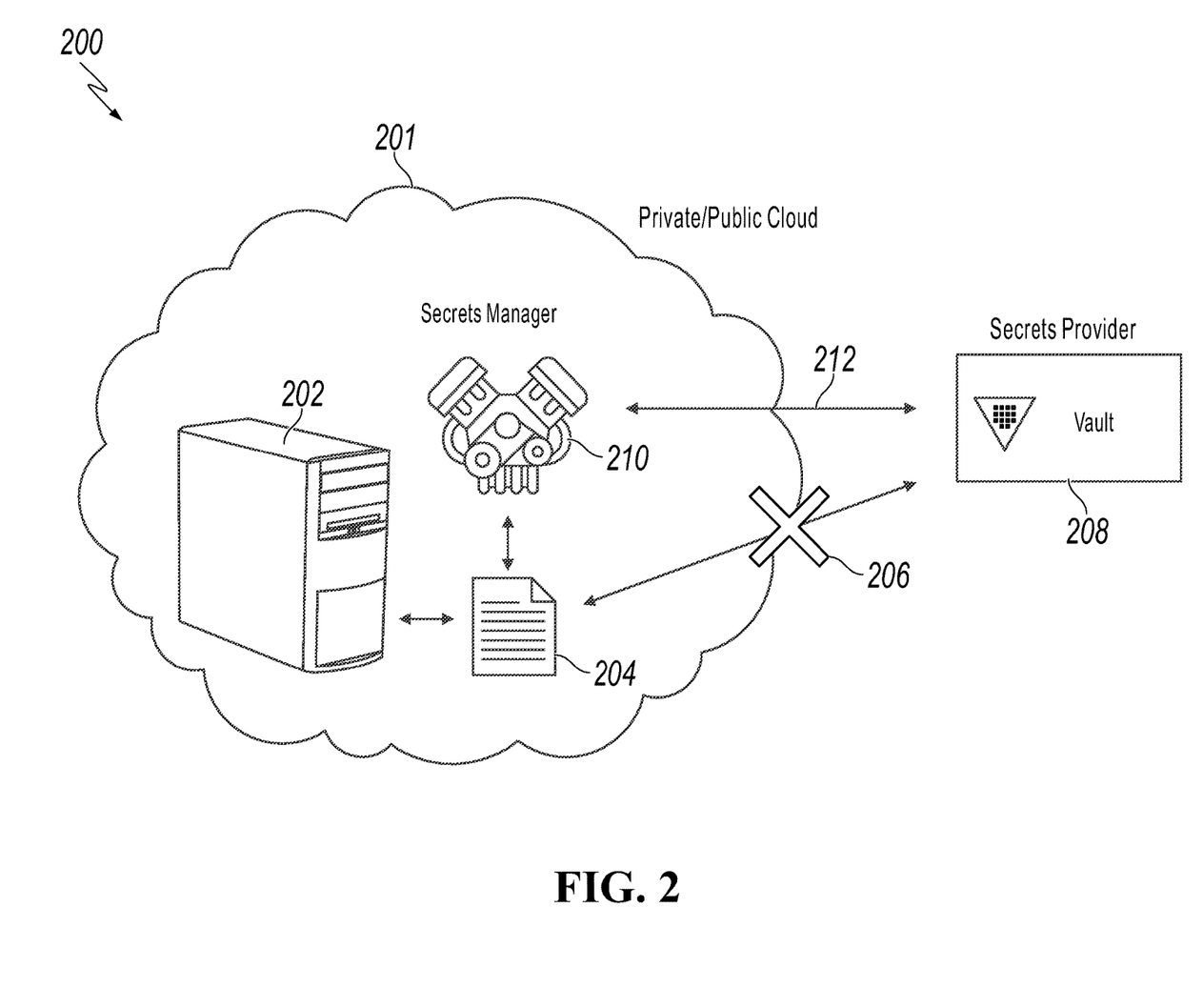
FIG. 2 illustrates an example system for secrets management.

FIG. 2 illustrates an example system 200 for secrets management. The system 200 can be or include a public or private cloud environment 201 or an on-premise system, for example. An application running on a device 202 (e.g., a client or server device) can provide a request 204 for a secret value. As indicated by an X symbol 206, the device 202 does not provide the request 204 directly to a secrets provider 208. Rather, the device 202 provides the request 204 to a secrets manager 210. As illustrated by an arrow 212, the secrets manager 210, rather than the device 202, interacts directly with the secrets provider 208. For example, the secrets manager 210 can send requests to the secrets provider 208 on behalf of the device 202, receive a secret value from the secrets provider 208, and provide the secret value to the device 202. As mentioned and as described in more detail below, the secrets manager 210 can use machine learning to analyze and react to both the request 204 (before the request 204 is sent to the secrets provider 208) and responses from the secrets provider 208 (before those responses are sent to the device 202).

Figure 3:
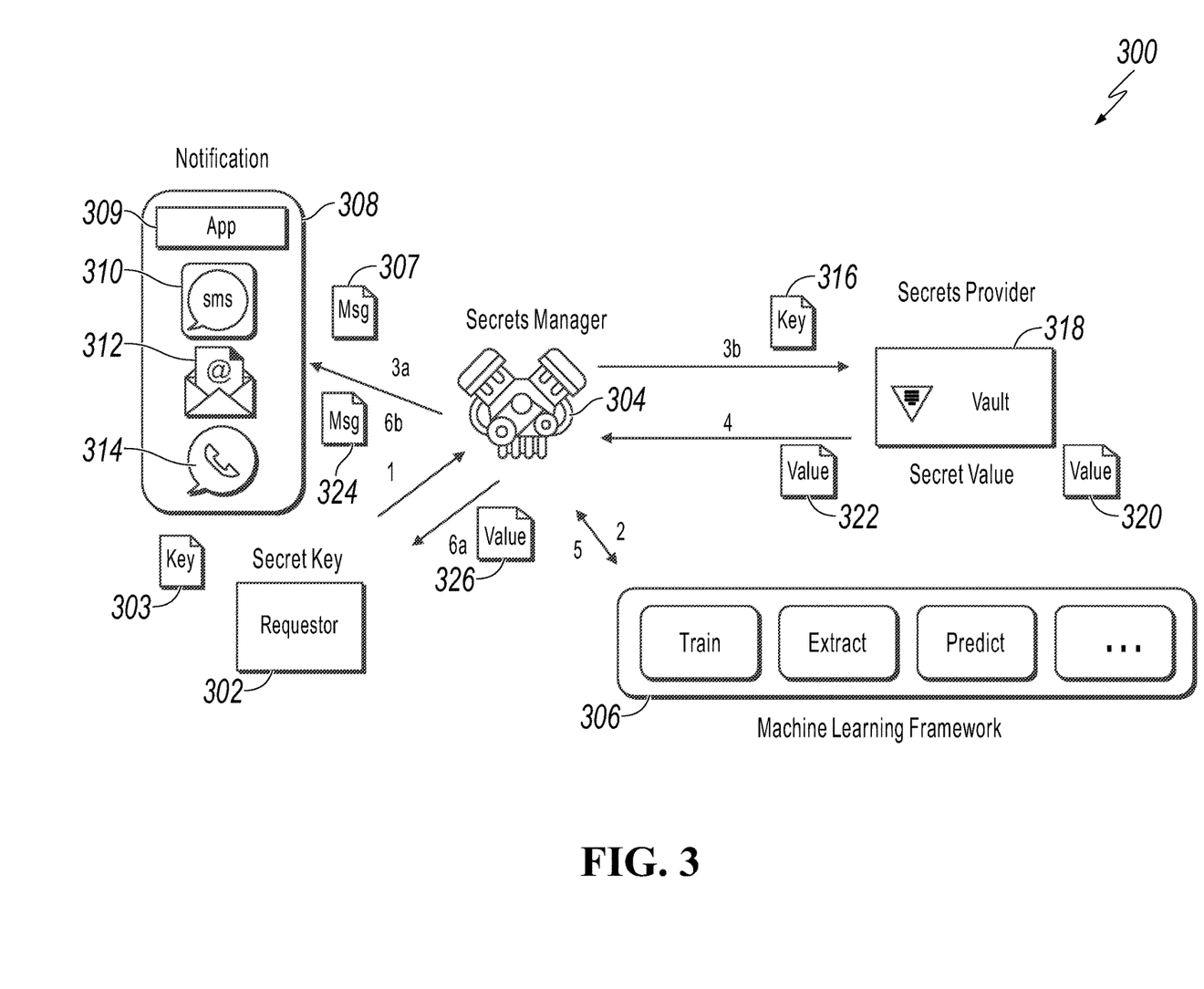
FIG. 3 illustrates an example system for secrets management.

FIG. 3 illustrates an example system 300 for managing requests for secret information. Different stages of requesting handling are denoted in FIG. 3 using numbered arrows. For instance, in a first stage (1), a requestor 302 sends a request 303 for a secret to a secrets manager 304. For example, the request 303 may be for a password for a particular resource that the requestor 302 intends to access. For example, the request 303 may be for a password for a particular user for logging into a database system. The request 303 can specify a key that identifies a requested secret value.

In a second stage (2), the secrets manager 304 analyzes the request 303 using a ML framework 306. Analyzing the request 303 can include validating the request 303. Validating the request 303 can include determining, for example, an IP address of the requestor 302 and comparing the IP address to permitted and/or prohibited addresses. If the IP address of the requestor 302 matches a known permitted address, the secrets manager 304 can accept the request 303. If the IP address of the requestor 302 matches a known prohibited address, the secrets manager 304 can deny the request 303.

Certain devices may be permitted to access certain secrets or types of secrets. For example, the secrets manager 304 can ensure that only certain authorized devices are able to retrieve a password for a database. The secrets manager 304 can determine that the request 303 is a certain type of request (e.g., a request for a database password) and accept or deny the request 303 based on whether the IP address of the requestor 302 is included in a list of permitted addresses that are allowed to request access for that type of request. Other types of restricted access can be enforced. For example, the secrets manager 304 can ensure that only devices having certain IP addresses are allowed to retrieve secret values associated with certain user identifiers.

Analyzing the request using the ML framework 306 can include comparing characteristics of the request to patterns learned by or configured in the ML framework 306. For example, the ML framework 306 can analyze request frequency information to determine whether the request 303 appears to be a valid request. For example, the ML framework 306 can increment request frequency counts for the requested secret value, the IP address of the requestor 302, a geographic location of the requestor 302, a user identifier associated with the request, etc., and compare the incremented frequency counts to respective predetermined threshold to determine whether any frequency counts are now over a respective predetermined threshold.

For example, the ML framework 306 can determine that the request 303 may be a security attack if any of a number of requests for a same value, a number of requests from the requestor 302 within a predetermined time window (e.g., the previous hour), a number of requests from a geographic location, or a number of requests associated with the user identifier are more than a respective predetermined threshold. Too many requests in a certain time period may indicate an attack, such as a distributed denial-of-service (DDOS) attack.

Different devices, users, locations, and applications may have different thresholds based on prior learning or configuration of the ML framework 306. For instance, normal behavior of one user, device, or application may be to submit requests more frequently than other users, devices, or applications. The ML framework 306 can learn, over time, which patterns are valid for certain contexts and which may be suspicious.

The ML framework 306 can perform other types of pattern analysis to identify potential fraudulent requests. For example, the ML framework 306 may determine that the request 303 is for a secret that has not been requested in more than a predetermined period of time (e.g., one year). The ML framework 306 can determine that requesting an infrequently-requested secret may be suspicious. The ML framework 306 can determine to notify an administrator about this or other types of suspicious or fraudulent requests, as described below.

In a third stage (e.g., 3a and/or 3b), the secrets manager 304 takes action based on results of analyzing the request 303 using the ML framework 306. For example, if the secrets manager 304 has determined that the request 303 is invalid, the secrets manager 304 can notify an administrator by sending a message 307 using one or more notification mechanisms 308 (e.g., an application 309, a text message service 310, an e-mail message service 312, and/or a phone call service 314). Additionally, the secrets manager 304 can respond to the request 303 by notifying the requestor 302 that the request 303 has not been accepted.

If the secrets manager 304 has determined that the request 303 is valid, the secrets manager 304 can send the request 303 (e.g., as a request 316) to a secrets provider 318. The secrets provider 318 can store a secret value 320 that can be identified by a key specified in the request 316, for example.

In a fourth stage (4), the secrets manager 304 receives a response from the secrets provider 318. For example, the secrets provider 318 can provide a value 322 that has been retrieved using the key specified in the request 316. As another example, the secrets provider 318 can send a response to the secrets manager 304 that indicates that a value was not retrieved (e.g., due to the secrets provider 318 not storing a value identifiable by the key in the request, a problem with the request, or some other error condition).

In a fifth stage (5), the secrets manager 304 analyzes the response from the secrets provider 318 using the ML framework 306. For example, the ML framework 306 can analyze the value 322 to determine if the secret value is acceptable and/or allowable to be returned to the requestor 302. For example, the ML framework 306 can compare the value 322 to one or more learned or configured policies that are identified for the request 303 based, for example, on an organization that has been determined for the request 303 (e.g., based on a user or device identifier, for example). For example, an organization may have rules for password values.

In a sixth stage (e.g., 6a and/or 6b) the secrets manager 304 takes action based on the analysis of the response from the secrets provider 318. For example, the secrets manager 304 can send a message 324, such as to an administrator, using one or more of the notification mechanisms 308. For instance, the secrets manager 304 may determine that the value 322 received from the secrets provider 318 violates one or more organizational policies and should not be used for accessing a requested resource. The secrets manager 304 can notify the administrator and/or the requestor 302 that the value 322 cannot be provided to the requestor 302. In some implementations, the administrator (or the secrets manager 304) can trigger a process to resolve the issue with the value 322, such as a password-reset process.

If the secrets manager 304 determines that the value 322 can be provided in response to the request 303, the secrets manager can provide the value 322 (e.g., as a value 326) to the requestor 302. In some cases, analysis results, such as warnings or other insights can be provided to the requestor 302 along with the value 326 (e.g., a warning about a moderate-strength password with a recommendation for increasing the strength of the password).

Figure 4:
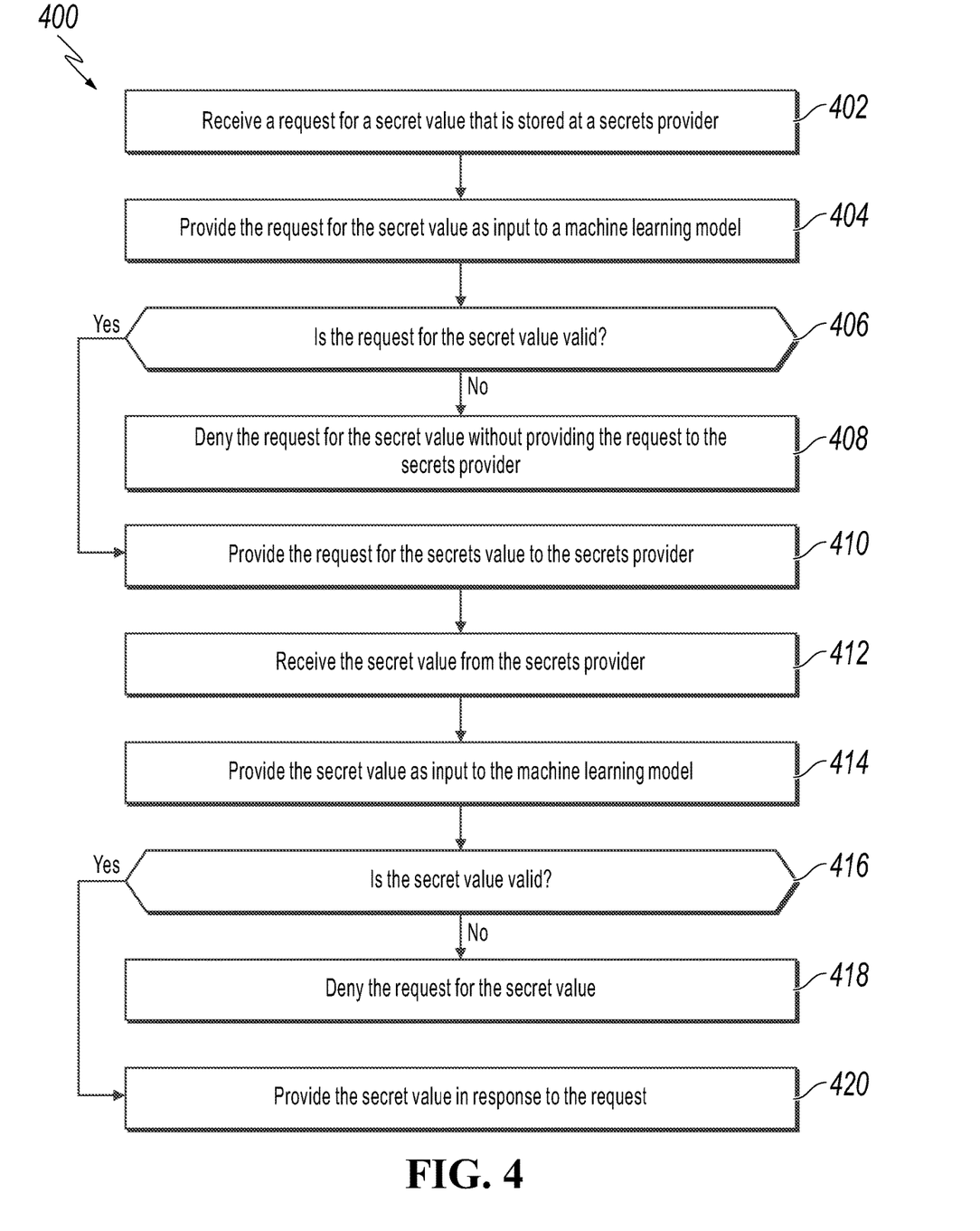
FIG. 4 is a flowchart of an example method for managing secret values.

FIG. 4 is a flowchart of an example method for managing secret values. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the secrets manager 105 of FIG. 1.

At 402, a request is received for a secret value that is stored at a secrets provider. The secrets provider can be a software vault system. The request for the secret value can include a key that is mapped to the secret value at the secrets provider.

At 404, the request for the secret value is provided as a first input to a machine learning model that is trained to determine whether secret values and requests for secret values are valid. The machine learning model is included in a secrets manager that is separate from the secrets provider.

At 406, a first output is received from the machine learning model that indicates whether the request for the secret value is valid.

At 408, in response to determining that the request for the secret value is not valid, the request for the secret value is denied without providing the request for the secret value to the secrets provider. Denying the request for the secret value can include providing a response to the request that indicates that the request has been denied. In response to determining that the request is not valid, a notification can be provided to an administrator device. Determining that the request for the secret value is not valid can include, for example: 1) determining, by the machine learning model, that a device identifier associated with the request is not authorized to make the request; 2) determining that a number of requests associated with the device identifier in a predetermined time period has exceeded a predetermined threshold, or 3) determining that a number of requests for the secret value in a predetermined time period has exceeded a predetermined threshold.

At 410, in response to determining that the request for the secret value is valid, the request for the secrets value is provided to the secrets provider. Providing the request to the secrets provider can include logging in to the secrets provider.

At 412, the secret value is received from the secrets provider.

At 414, the secret value is provided as a second input to the machine learning model.

At 416, a second output is received from the machine learning model that indicates whether the secret value is valid.

At 418, in response to determining that the secret value is not valid, the request for the secret value is denied. In response to determining that the secret value is not valid, a notification can be provided to an administrator device. Determining that the secret value is not valid can include determining that the secret value does not comply with at least one policy.

At 420, in response to determining that the secret value is valid, the secret value in response to the request for the secret value.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving, over a network and at a secrets manager, a request from a client device of a user associated with an entity for a secret value that is stored at a secrets provider, wherein the secrets providers is a separate system from the secrets manager and wherein the entity is associated with a set of secret value policies;
   providing the request for the secret value as a first input to a machine learning model included in the secrets manager that is trained to determine whether secret values and requests for secret values are valid;
   receiving a first output from the machine learning model that indicates whether the request from the client device for the secret value is valid;
   in response to determining that the request from the client device for the secret value is not valid, denying the request for the secret value, by the secrets manager, without forwarding the request for the secret value to the secrets provider; and
   in response to determining that the request from the client device for the secret value is valid:
      forwarding, over the network, the request from the client device for the secrets value to the secrets provider;
      receiving, over the network and at the secrets manager, the secret value from the secrets provider;
      providing the secret value as a second input to the machine learning model to determine whether the secret value requested by the client device violates any secret value policy of the set of secret value policies associated with the entity;
      receiving a second output from the machine learning model that indicates whether the secret value requested by the client device violates any secret value policy of the set of secret value policies associated with the entity;
      in response to determining that the secret value requested by the client device violates at least one secret value policy of set of secret value policies associated with the entity, denying the request for the secret value; and
      in response to determining that the secret value requested by the client device does not violate any secret value policy of the set of secret value policies associated with the entity, providing, over the network, the secret value to the client device in response to the request.

2. The computer-implemented method of claim 1, wherein the secrets provider is a software vault system.

3. The computer-implemented method of claim 1, wherein providing the request to the secrets provider comprises logging in to the secrets provider.

4. The computer-implemented method of claim 1, wherein the request for the secret value includes a key that is mapped to the secret value at the secrets provider.

5. The computer-implemented method of claim 1, further comprising, in response to determining that the request is not valid, providing a notification to an administrator device.

6. The computer-implemented method of claim 5, further comprising, in response to determining that the secret value violates at least one policy of the organization, providing a notification to the administrator device.

7. The computer-implemented method of claim 1, wherein denying the request for the secret value comprises providing a response to the request, to the client device, that indicates that the request has been denied.

8. The computer-implemented method of claim 1, wherein determining that the request for the secret value is not valid comprises, determining, by the machine learning model, that a device identifier associated with the request is not authorized to make the request.

9. The computer-implemented method of claim 8, wherein determining that the request for the secret value is not valid comprises determining that a number of requests associated with the device identifier in a predetermined time period has exceeded a predetermined threshold.

10. The computer-implemented method of claim 1, wherein determining that the request for the secret value is not valid comprises determining that a number of requests for the secret value in a predetermined time period has exceeded a predetermined threshold.

11. A system comprising:
a network;
a secrets provider;
a client device;
a secrets manager that is a separate system from the secrets provider; and
a machine learning model included in the secrets manager that is trained to determine whether secret values and requests for secret values are valid;
wherein the secrets manager is configured to:
receive, over the network, a request from the client device of a user associated with an entity for a secret value that is stored at the secrets provider, wherein the entity is associated with a set of secret value policies;
provide the request for the secret value as a first input to the machine learning model;
receive a first output from the machine learning model that indicates whether the request from the client device for the secret value is valid;
in response to determining that the request from the client device for the secret value is not valid, deny the request for the secret value without forwarding the request for the secret value to the secrets provider; and
in response to determining that the request from the client device for the secret value is valid:
forward, over the network, the request for the secrets value to the secrets provider;
receive, over the network, the secret value from the secrets provider;
provide the secret value as a second input to the machine learning model to determine whether the secret value requested by the client device violates any secret value policies of the set of secret value policies associated with the entity;
receive a second output from the machine learning model that indicates whether the secret value requested by the client device violates any secret value policies of the set of secret value policies associated with the entity;
in response to determining that the secret value requested by the client device violates at least one secret value policy of the set of secret value policies associated with the entity, deny the request for the secret value; and
in response to determining that the secret value requested by the client device does not violate any secret value policy of the set of secret value policies associated with the entity, provide, over the network, the secret value to the client device in response to the request.

12. The system of claim 11, wherein the secrets provider is a software vault system.

13. The system of claim 11, wherein the secrets manager providing the request to the secrets provider comprises the secrets manager logging in to the secrets provider.

14. The system of claim 11, wherein the request for the secret value includes a key that is mapped to the secret value at the secrets provider.

15. The system of claim 11, wherein the secrets manager is further configured to, in response to determining that the request from the client device is not valid, provide a notification to an administrator device.

16. A non-transitory, computer-readable medium coupled to one or more processors and having instructions stored thereon which, when executed by the one or more processors, cause the one or more processors to perform operations, the operations comprising:
receiving, over a network and at a secrets manager, a request from a client device of a user associated with an entity for a secret value that is stored at a secrets provider, wherein the secrets providers is a separate system from the secrets manager and wherein the entity is associated with a set of secret value policies;
providing the request for the secret value as a first input to a machine learning model included in the secrets manager that is trained to determine whether secret values and requests for secret values are valid;
receiving a first output from the machine learning model that indicates whether the request from the client device for the secret value is valid;
in response to determining that the request from the client device for the secret value is not valid, denying the request for the secret value, by the secrets manager, without forwarding the request for the secret value to the secrets provider; and
in response to determining that the request from the client device for the secret value is valid:
forwarding, over the network, the request from the client device for the secrets value to the secrets provider;
receiving, over the network and at the secrets manager, the secret value from the secrets provider;
providing the secret value as a second input to the machine learning model to determine whether the secret value requested by the client device violates any secret value policy of the set of secret value policies associated with the entity;
receiving a second output from the machine learning model that indicates whether the secret value requested by the client device violates any secret value policy of the set of secret value policies associated with the entity;
in response to determining that the secret value requested by the client device violates at least one secret value policy of set of secret value policies associated with the entity, denying the request for the secret value; and
in response to determining that the secret value requested by the client device does not violate any secret value policy of the set of secret value policies associated with the entity, providing, over the network, the secret value to the client device in response to the request.

17. The computer-readable medium of claim 16, wherein the secrets provider is a software vault system.

18. The computer-readable medium of claim 16, wherein providing the request to the secrets provider comprises logging in to the secrets provider.

19. The computer-readable medium of claim 16, wherein the request for the secret value includes a key that is mapped to the secret value at the secrets provider.

* * * * *